US007003887B2

(12) United States Patent
Wadge

(10) Patent No.: US 7,003,887 B2
(45) Date of Patent: Feb. 28, 2006

(54) SHOE CLAMPING MECHANISM FOR POWER TOOL AND POWER TOOL INCORPORATING SUCH MECHANISM

(75) Inventor: Brian Wadge, County Durham (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/124,570

(22) Filed: May 6, 2005

(65) Prior Publication Data
US 2005/0198834 A1   Sep. 15, 2005

Related U.S. Application Data

(63) Continuation of application No. 10/760,688, filed on Jan. 20, 2004.

(30) Foreign Application Priority Data
Feb. 7, 2003   (GB) .................................. 0302787

(51) Int. Cl.
B27B 11/10   (2006.01)
(52) U.S. Cl. ..................... 30/376; 30/392; 83/747; 83/698.11; 144/154.5
(58) Field of Classification Search .......... 30/374–376, 30/371, 392–394; 83/698.11, 829, 747, 781; 411/339, 412–413; 144/154.5, 216–217
See application file for complete search history.

(56) References Cited

U.S. PATENT DOCUMENTS

| 3,087,519 | A | * | 4/1963 | McCarty et al. ............... 30/376 |
| 4,961,544 | A | * | 10/1990 | Bidoia ........................ 242/395 |
| 5,012,583 | A | * | 5/1991 | Blochle et al. ............... 30/392 |
| 5,517,763 | A | | 5/1996 | Schilling et al. |
| 5,617,638 | A | | 4/1997 | Amano et al. |
| 5,644,845 | A | | 7/1997 | Durr et al. |
| 5,727,322 | A | | 3/1998 | Giacometti |
| 5,778,538 | A | | 7/1998 | Gentinetta et al. |
| 6,357,124 | B1 | | 3/2002 | Wall et al. |
| 6,456,774 | B1 | * | 9/2002 | Lin ............................. 385/140 |
| 6,553,675 | B1 | * | 4/2003 | Orrico ........................ 30/376 |

FOREIGN PATENT DOCUMENTS

| EP | 0 603 552 | 6/1994 |
| EP | 1 445 054 | 12/2004 |
| JP | 2001-289501 | 10/2001 |

* cited by examiner

Primary Examiner—Allan N. Shoap
Assistant Examiner—Phong Nguyen
(74) Attorney, Agent, or Firm—Harness, Dickey & Pierce, P.L.C.

(57) ABSTRACT

A mechanism is disclosed for clamping a jigsaw (1) shoe in a desired position relative to the body of a power tool. A plurality of gear (22, 26) teeth are used to allow greater torque and access as compared to prior art clamping mechanisms.

12 Claims, 6 Drawing Sheets

SHOE CLAMPING MECHANISM FOR POWER TOOL AND POWER TOOL INCORPORATING SUCH MECHANISM

The present invention relates to a shoe clamping mechanism for a power tool, and to a power tool incorporating such a mechanism. The invention relates particularly, but not exclusively, to a shoe clamping mechanism for a jigsaw.

BACKGROUND OF THE INVENTION

Jigsaws generally include a housing containing a motor for driving a saw blade in a reciprocating manner. A shoe, having a generally flat lower surface for location against a workpiece to be cut by the saw, is mounted to the housing of the saw, and forms a reaction surface such that when the saw blade moves away from the workpiece, the shoe forms a reaction surface to enable cutting action, whereas when the blade moves towards the workpiece, debris produced by the cutting action is displaced from the vicinity of the blade.

In order to enable bevel cutting of a workpiece, it is desirable to provide a shoe which is pivotable relative to the housing about a longitudinal axis, and a clamping mechanism for clamping the shoe in one or more desired orientations relative to the saw blade. In this way, when the shoe rests on a workpiece, bevel cutting at an angle corresponding to the angle of inclination between the shoe and the saw housing is also possible.

DE 19546162 discloses a clamping mechanism for a shoe of a jigsaw in which a shoe can be clamped in a plurality of orientations relative to a housing of the jigsaw by means of rotation of a double threaded screw about its longitudinal axis by means of a lever. Rotation of the lever in one direction causes the shoe to be clamped in position between a clamping plate and the housing, whereas rotation of the lever in the opposite direction increases the separation between the clamping plate and the housing to allow the shoe to be pivoted relative to the saw blade.

However, this prior art arrangement suffers from the drawback that the provision of a screw having oppositely wound threads increases the cost of production of the apparatus, and the provision of a lever pivoting about the longitudinal axis of the double threaded screw still limits the extent to which the lever can be rotated in the space available between the shoe and the saw housing.

EP 0603552 discloses a shoe clamping mechanism for a saw in which rotation of a screw thread about a first axis to clamp a shoe in position relative to a saw housing is achieved by rotation of a rotatable hand grip about a second axis perpendicular to the first axis. Cooperating conical gears parallel to each axis ensure that rotation of the hand grip about the second axis causes rotation of the screw thread about the first axis. This arrangement suffers from the drawback, however, that conical gears are expensive components to manufacture and must be located relatively accurately relative to each other, since the focuses of the two conical gears must generally coincide with each other to ensure correct operation. As a result, this significantly increases the cost of production of a saw incorporating the clamping mechanism.

EP 0970771 discloses a jigsaw base clamping system in which a shoe is fixed in a predetermined orientation relative to a saw housing by means of a clamping mechanism incorporating moveable wedge shaped ramps. This arrangement suffers from the drawback that the large number of cooperating moving parts significantly increases the cost of production of a tool incorporating the mechanism.

Preferred embodiments of the present invention seek to overcome the above disadvantages of the prior art.

BRIEF SUMMARY OF THE INVENTION

According to an aspect of the present invention, there is provided a shoe clamping mechanism for a power tool having a housing, a working member extending from the housing, and a shoe for engaging a workpiece and adapted to be clamped in a plurality of orientations relative to the working member, the mechanism comprising:

clamping means having a clamping portion and a mounting portion, wherein the clamping means is adapted to be mounted to the tool such that rotation of said mounting portion relative to the housing about a first axis causes movement of said clamping portion between a first position in which said shoe is pivotable relative to the working member and a second position in which said shoe is clamped in position relative to said working member;

actuating means adapted to be pivoted about a second axis, substantially parallel to said first axis and displaced therefrom; and torque adjusting means connected to said actuating means and said clamping means wherein application of a first torque to pivot said actuating means about said second axis causes application of a second torque, higher than said first torque, to said clamping means to rotate said mounting portion about said first axis.

By providing actuating means adapted to be pivoted about a second axis substantially parallel to, but displaced from, said first axis, this provides the advantage of making the actuating means more accessible than in the prior art, while also enabling the torque adjusting means to be constructed in a simple manner. For example, the torque adjusting means could be in the form of gears causing rotation of a first gear about a first axis as a result of rotation of a second gear about a second axis, complicated and expensive gear arrangements not being necessary if the first and second axes are not generally parallel to each other.

The torque adjusting means may comprise a gear mechanism.

The gear mechanism may comprise a first gear having a plurality of first gear teeth and mounted to said actuating means and a second gear having a plurality of second gear teeth and connected to said mounting portion, wherein the number of said second gear teeth is larger than the number of said first gear teeth.

This provides the advantage of enabling a higher torque to be applied to the clamping means by means of a mechanism of simple construction.

The clamping portion may comprise a clamping plate restrained in use from rotating about said first axis.

The mechanism may further comprise a track for receiving said clamping plate and fixed in position relative to said housing.

The actuating means may comprise a thumb wheel.

The mounting portion may include a screw thread.

According to another aspect of the present invention, there is provided a shoe assembly for a power tool having a housing, and a working member extending from the housing, the assembly comprising:

a shoe plate for engaging a workpiece and adapted to be clamped in a plurality of orientations relative to the working member; and a shoe clamping mechanism as defined above.

The shoe plate may comprise a first arcuate portion for cooperating with a second arcuate portion on the housing.

The shoe plate may further comprise an aperture adapted to receive said clamping means.

According to a further aspect of the present invention, there is provided a tool comprising:

a housing;

a working member extending from the housing; and a shoe assembly as defined above.

The housing may further comprise a second arcuate portion for engaging said first arcuate portion.

The tool may be a reciprocating saw.

BRIEF DESCRIPTION OF THE DRAWINGS

A preferred embodiment of the invention will now be described, by way of example only and not in any limitative sense, with reference to the accompanying drawings, in which.

DETAILED DESCRIPTION OF THE INVENTION

Figure 1:
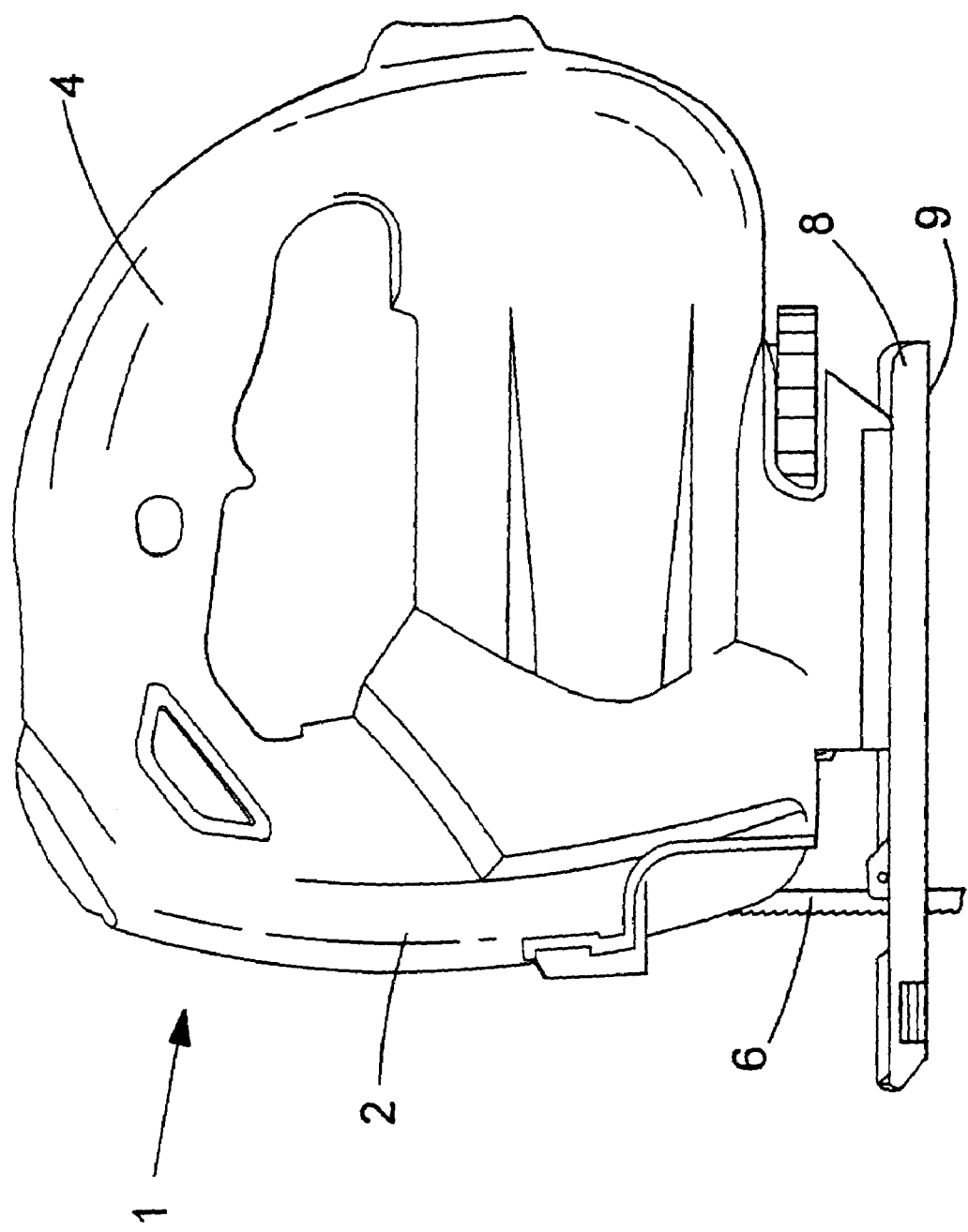
FIG. 1 is a side view of a reciprocating saw embodying the present invention.

Referring to FIG. 1, a reciprocating saw such as a jigsaw (1) has a housing (2) of durable plastics material in which a handle (4) is formed. A trigger switch (not shown) for actuating the saw is provided in the handle (4) and operates in a manner which will be familiar to persons skilled in the art. The housing (2) accommodates a motor (not shown), and a rotary output shaft of the motor co-operates with a scotch yoke mechanism, as will be familiar to persons skilled in the art and will therefore not be described in further detail herein, to cause vertical reciprocating motion of a jigsaw blade (6) in response to rotation of the rotary output shaft of the motor.

Figure 2:
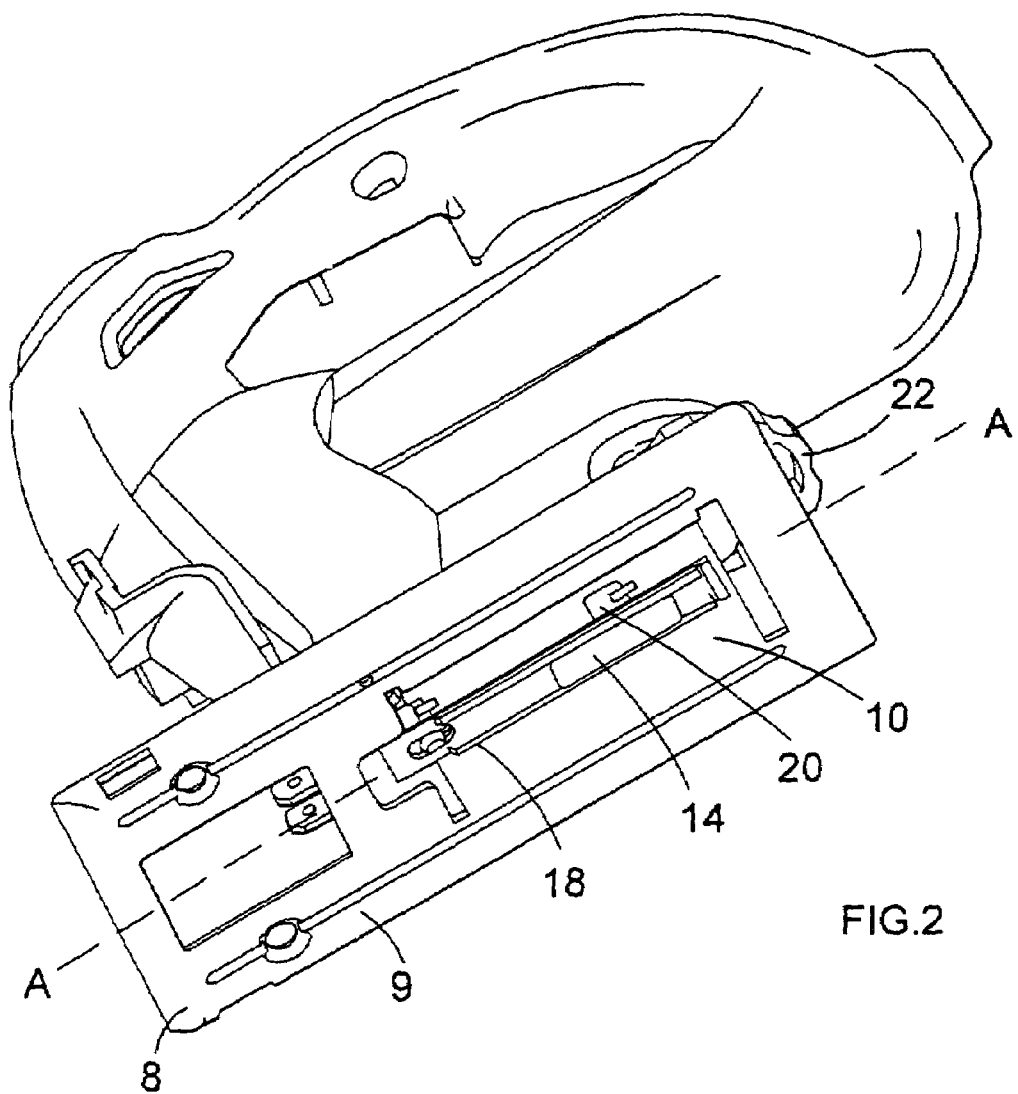
FIG. 2 is a perspective view from below from the saw of FIG. 1.
Figure 3:
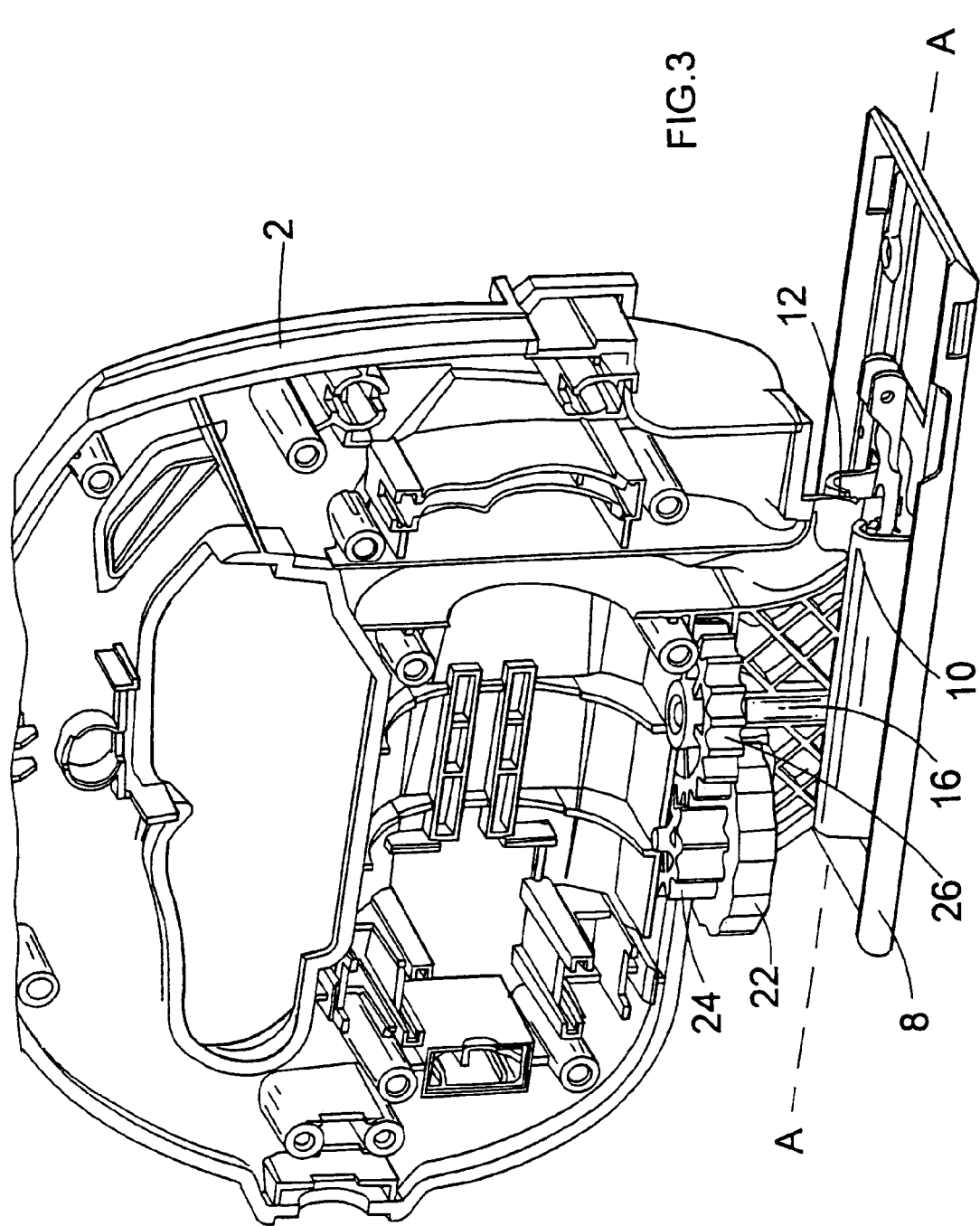
FIG. 3 is a partially cut away, side perspective view of a shoe assembly and housing of the saw of FIG. 1.
Figure 4:
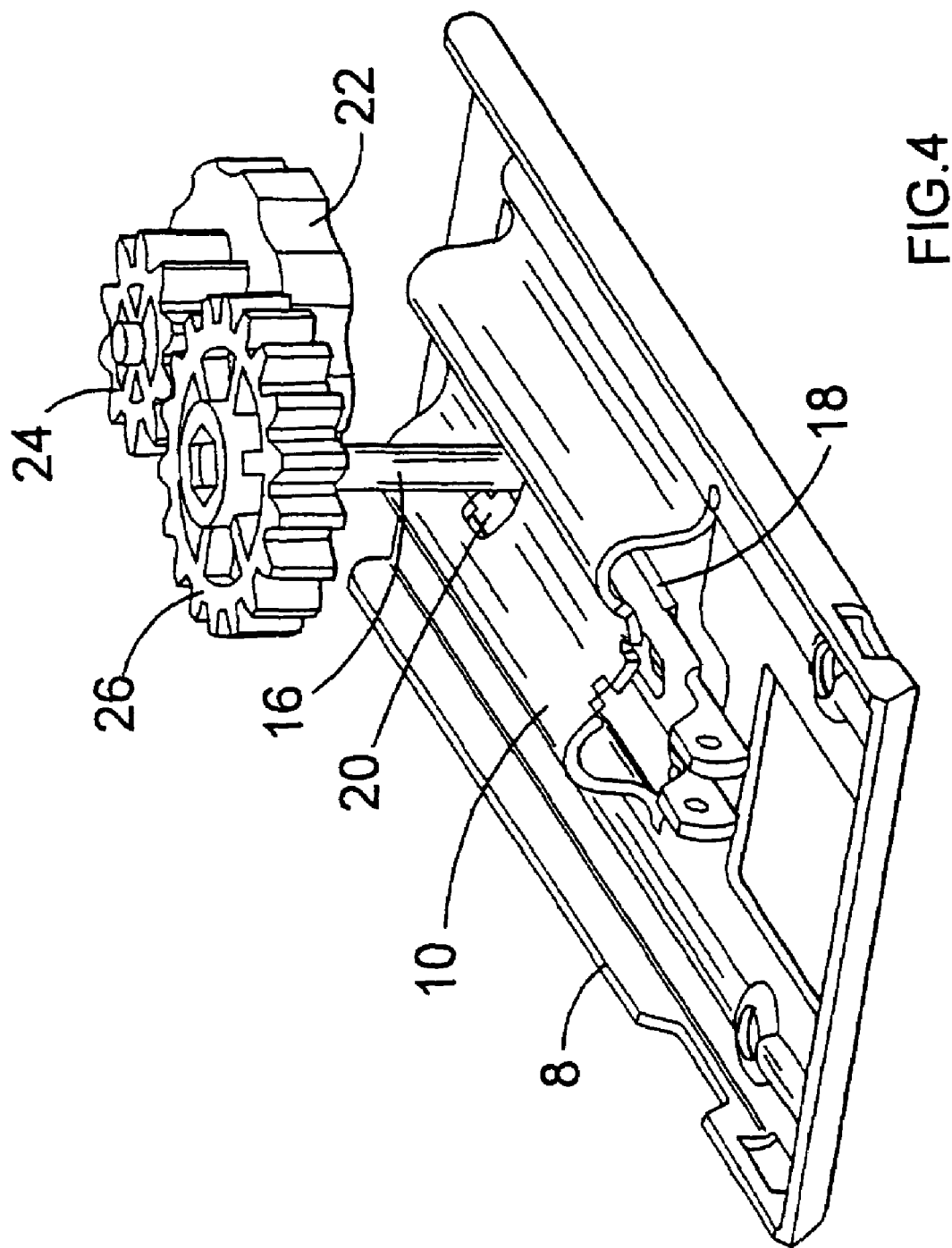
FIG. 4 is a perspective view of a shoe assembly of FIG. 3 when removed from the saw.
Figure 5:
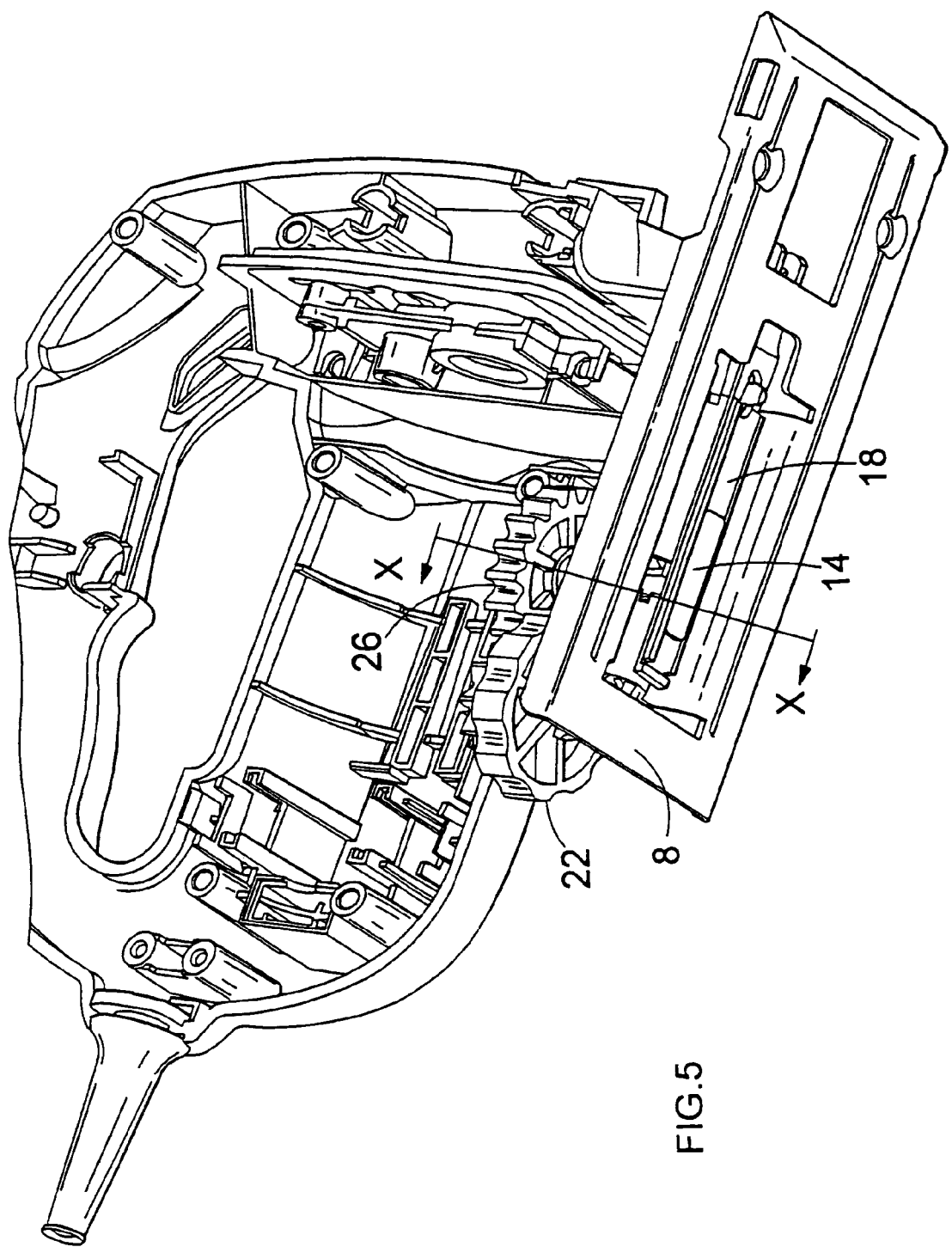
FIG. 5 is a further perspective view from below, corresponding to FIG. 3, of the shoe assembly and housing of FIG. 3.
Figure 6:
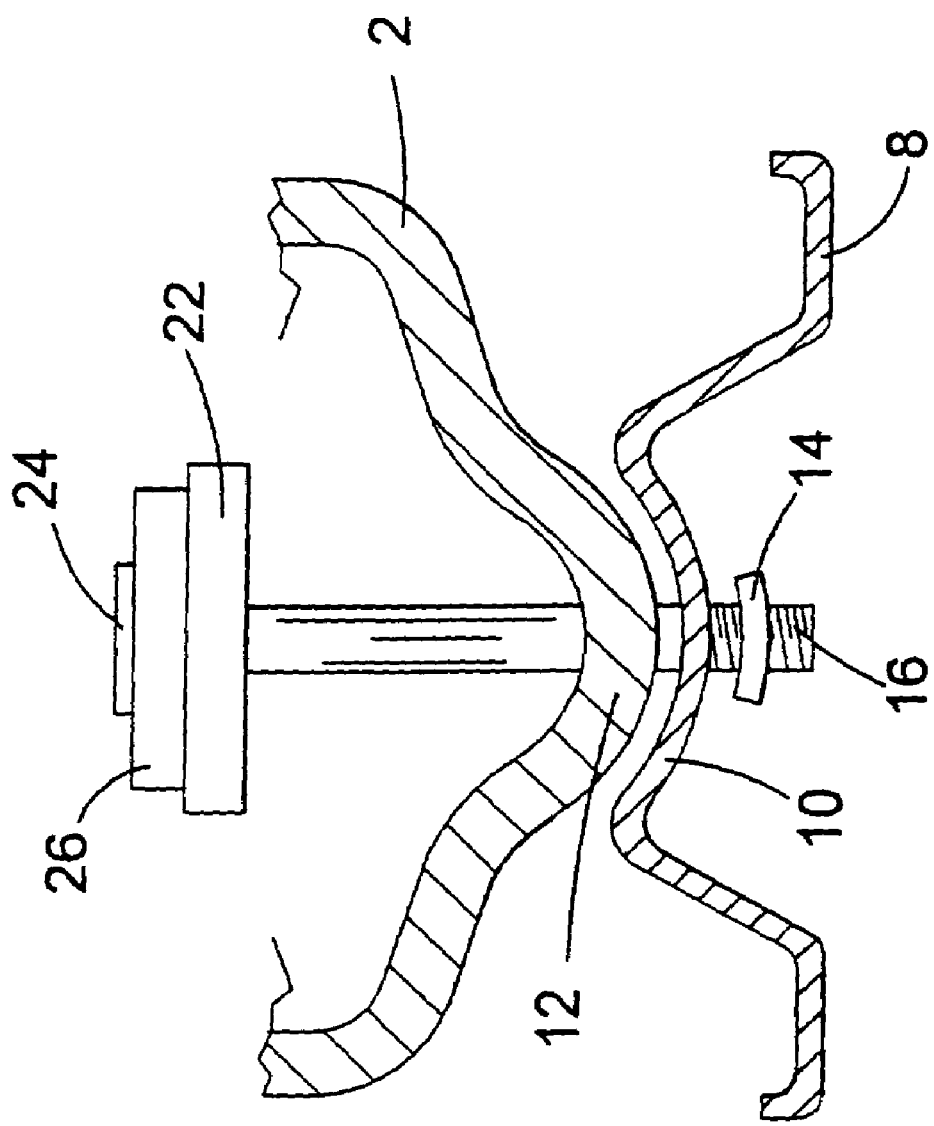
FIG. 6 is a sectional view along the line X—X in FIG. 5.

A shoe or sole plate (8) is mounted to the housing (2) by means of a clamping mechanism to be described in grater detail below, and has a generally flat base (9) for resting on a workpiece (not shown) in such a manner that as the jigsaw blade (6) moves upwards as shown in FIG. 1, the sole plate (8) provides a reaction surface to enable cutting action by the blade (6), and debris produced by the cutting action is displaced away from the blade during the downward stroke. The sole plate (8) is pivotable about a longitudinal axis A—A (FIGS. 2 and 3) to adjust the orientation of the base (9) relative to the blade (6) to enable bevel cutting of a workpiece.

Referring now to FIGS. 2–6, the sole plate (8), which is stamped from a single sheet of metal such as steel, has a concave, longitudinally extending central portion (10) of generally part-circular cross section in a direction transverse to axis A—A, for mating with a corresponding convex portion (12) (FIG. 6) of the jigsaw body (2) to enable pivoting of the sole plate (8) relative to the body (2). In order to clamp the sole plate (8) in position relative to the body (2), a grab plate (14) is in threaded engagement with a screw thread (16) extending from the body (2) and the grab plate (14) is prevented from rotating relative to the sole plate (8), such that rotation of the screw thread (16) relative to the sole plate (8) causes longitudinal movement of the grab plate (14) along the screw thread (16). In other words, rotation of the screw thread (16) in one sense causes the grab plate (14) to clamp the concave central portion (10) in position between the grab plate (14) and the convex portion (12) of the body (2) to prevent pivoting of the sole plate (8) relative to the saw blade (6). Similarly, rotation of the screw thread (16) in the opposite sense causes the grab plate (14) and convex portion (12) to move further apart to enable to sole plate (8) to pivot relative to the blade (6). The grab plate (14) is prevented from rotating relative to the sole plate (8) by means of a guide track (18) (FIG. 5), the track (18) being fixed relative to the saw body (2). The sole plate (8) is provided with a cut out portion (20) extending in a direction perpendicular to the axis A—A for accommodating the screw thread (16) at different orientations of the central portion (10) relative to the housing (2).

In order to actuate the screw thread (16) to move the grab plate (14) between a position in which the central portion (10) is clamped in position between the grab plate (14) and convex portion (12), and a position in which the sole plate (8) can pivot about axis A—A relative to the body (2), a gear wheel (26) is mounted coaxially with screw thread (16) and co-operates with a further gear wheel (24) which is coaxially mounted to a thumb wheel (22). In this way, the rotational axis of thumb wheel (22) is displaced from the rotational axis of screw thread (16), thus making thumb wheel (22) more accessible to the user in the limited space available between the sole plate (8) and body (2). In addition, the first gear (26) has a larger number of teeth than the second gear (24), as a result of which application of a first torque to thumb wheel (22) results in application of a second, higher torque to screw thread (16). In this way, a higher torque can be applied to screw thread 16 than if the user had applied a torque directly by hand to the second gear (26), for example by means of a thumb wheel (not shown) located coaxially with screw thread (16). As a result of the improved accessibility of thumb wheel (22) in the limited space available between the sole plate (8) and body (2), the thumb wheel (22) can be rotated through approximately 270° by a user, without the user having to reposition his fingers.

It will be appreciated by persons skilled in the art that the above embodiment has been described by way of example only, and not in any limitative sense, and that various alterations and modifications are possible without departure from the scope of the invention as defined by the appended claims.

What is claimed is:

1. A shoe clamping mechanism for a power tool having a housing, a working member extending from the housing, and a shoe for engaging a workpiece and adapted to be clamped in a plurality of orientations relative to the working member, the mechanism comprising:

clamping means having a clamping portion and a mounting portion, wherein the clamping means is adapted to be mounted to the tool such that rotation of said mounting portion relative to the housing about a first axis causes movement of said clamping portion between a first position in which said shoe is pivotable relative to the working member and a second position in which said shoe is clamped in position relative to said working member;

actuating means adapted to be pivoted about a second axis, substantially parallel to said first axis and displaced therefrom; and torque adjusting means connected to said actuating means and said clamping means wherein application of a first torque to pivot said actuating means about said second axis causes application of a second torque, higher than said first torque, to said clamping means to rotate said mounting portion about said first axis.

2. A mechanism according to claim 1, wherein the torque adjusting means comprises a gear mechanism.

3. A mechanism according to claim 2, wherein the gear mechanism comprises a first gear having a plurality of first gear teeth and mounted to said actuating means and a second gear having a plurality of second gear teeth and connected to said mounting portion, wherein the number of said second gear teeth is larger than the number of said first gear teeth.

4. A mechanism according to claim 1, wherein the clamping portion comprises a clamping plate restrained in use from rotating about said first axis.

5. A mechanism according to claim 4, further comprising a track for receiving said clamping plate and fixed in position relative to said housing.

6. A mechanism according to any claim 1, wherein the mounting portion includes a thumb wheel.

7. A mechanism according to claim 1, wherein the mounting portion includes a screw thread.

8. A tool comprising a housing, a working member extending from the housing, a shoe engagable with a workpiece and clampable in a plurality of orientations relative to the working member, and a shoe clamping assembly comprising:

a clamp;

a mount coupling with said clamp, rotation of said mount relative to the housing about a first axis causing movement of said clamp between a first position in which said shoe is pivotable relative to the working member and a second position in which said shoe is clamped in position relative to said working member;

a thumb wheel pivotable about a second axis, substantially parallel to said first axis and displaced therefrom;

a gear mechanism connected between said thumb wheel and said clamp, wherein application of a first torque to pivot said thumb wheel about said second axis causes application of a second torque to said mount to rotate said mount about said first axis.

9. A tool according to claim 8, wherein the shoe comprises a first arcuate portion for cooperating with a second arcuate portion on the housing.

10. A tool according to claim 9, wherein the shoe plate comprises an aperture adapted to receive said clamp.

11. The tool recited in claim 8, said gear mechanism comprising a first gear connected to said thumb wheel and a second gear connected to said mount.

12. A tool according to claim 11, wherein said tool is a reciprocating saw.

* * * * *